United States Patent [19]
Nakagawa et al.

[11] Patent Number: 5,648,176
[45] Date of Patent: Jul. 15, 1997

[54] METALLIC HONEYCOMB BODY FOR SUPPORTING CATALYST FOR AUTOMOBILES AND PROCESS FOR PRODUCING THE SAME

[75] Inventors: Toshikazu Nakagawa; Yasushi Ishikawa, both of Tokai; Sadao Tsushima, Futtsu; Masao Yashiro; Hitoshi Ohta, both of Tokai, all of Japan

[73] Assignee: Nippon Steel Corporation, Tokyo, Japan

[21] Appl. No.: 318,716

[22] PCT Filed: Feb. 8, 1994

[86] PCT No.: PCT/JP94/00188

§ 371 Date: Oct. 13, 1994

§ 102(e) Date: Oct. 13, 1994

[87] PCT Pub. No.: WO95/21695

PCT Pub. Date: Aug. 17, 1995

[51] Int. Cl.$^6$ .................. B01J 35/04; B23K 35/36; B32B 15/18
[52] U.S. Cl. .................. 428/593; 428/603; 428/683; 228/181; 228/194
[58] Field of Search .................. 428/593, 603, 428/610, 638, 683; 228/181, 194

[56] References Cited

U.S. PATENT DOCUMENTS

| | | | |
|---|---|---|---|
| 3,479,731 | 11/1969 | Mantel et al. | 29/472.3 |
| 3,716,347 | 2/1973 | Bergstrom et al. | 228/181 |
| 3,891,784 | 6/1975 | Allardyce et al. | 228/194 |
| 4,521,947 | 6/1985 | Nonnenmann et al. | 29/157 R |
| 4,522,059 | 6/1985 | Blair | 228/194 |
| 4,859,649 | 8/1989 | Böhnke et al. | 502/439 |
| 5,316,997 | 5/1994 | Toyoda et al. | 428/593 |
| 5,422,083 | 6/1995 | Sneller | 502/439 |
| 5,431,330 | 7/1995 | Wieres | 228/181 |

FOREIGN PATENT DOCUMENTS

| | | |
|---|---|---|
| 140531 | 8/1990 | China . |
| A-0056435 | 7/1982 | European Pat. Off. . |
| U-8412768 | 9/1987 | European Pat. Off. . |
| A-0562116 | 9/1993 | European Pat. Off. . |
| 3312944 | 10/1984 | Germany . |
| 54-13462 | 1/1979 | Japan . |
| 56-85514 | 7/1981 | Japan . |
| 57-22867 | 2/1982 | Japan ............... 228/194 |
| 63-36843 | 2/1988 | Japan . |
| B2 63-44466 | 9/1988 | Japan . |
| A 1-218636 | 8/1989 | Japan . |
| A 2-14747 | 1/1990 | Japan . |

*Primary Examiner*—John Zimmerman
*Attorney, Agent, or Firm*—Kenyon & Kenyon

[57] ABSTRACT

According to the present invention, there is provided a process for producing a honeycomb body for a metallic carrier from a flat foil and a corrugated foil, which comprises supplying a joining agent comprising a mixture of an adhesive with a carbon powder into abutted portions between the flat foil and the corrugated foil, depositing the joining agent onto the abutted portions to form a honeycomb body and heat-treating the honeycomb body only or an outer cylinder with the honeycomb body being inserted thereinto in a non-oxidizing atmosphere to mutually join the abutted portions in a liquid phase.

14 Claims, 6 Drawing Sheets

METALLIC HONEYCOMB BODY FOR SUPPORTING CATALYST FOR AUTOMOBILES AND PROCESS FOR PRODUCING THE SAME

This application is an application filed under 35USC371 of PCT/JP94/00688 filed Aug. 2, 1994.

1. Technical Field

The present invention relates to a metallic honeycomb body, for supporting a catalyst for purifying an exhaust gas discharged from internal combustion engines, such as automobile engines, and a process for producing the same.

2. Background Art

A metallic carrier for purifying an exhaust gas basically is comprised by a honeycomb body having a number of exhaust gas passages, in which the body is produced by alternately stacking flat or slightly corrugated metallic foils (hereinafter referred to as a "flat foils") comprising a ferritic stainless steel having a thickness of about 50 μm, particularly a heat-resisting alloy steel, such as a 20% Cr-5% Al—Fe alloy containing Al and metallic foil corrugating the above flat foils (hereinafter referred to as a "corrugated foils"), or by putting the flat foil on top of the corrugated foil and winding up these foils into a spiral form. In general, it further comprises, besides this honeycomb body, an outer cylinder for housing the honeycomb body therein, the outer cylinder comprising a heat-resisting alloy having excellent corrosion resistance and heat resistance. In the above honeycomb body, the metallic foils are mutually joined, and when the honeycomb body is inserted in the outer cylinder, the honeycomb body is fixed to the outer cylinder.

After a catalyst for purifying an exhaust gas is supported on the honeycomb body, the metallic carrier is mounted and fixed within an exhaust gas passage of, for example, an automobile engine. Since the metallic carrier is used in this state, it is exposed to a rapid cooling and heating cycle (a thermal shock cycle), so that joins between metallic foils of the honeycomb body and joins or fixes between the honeycomb body and the outer cylinder should be sufficiently firm.

The inside of the honeycomb body or a particular site between the honeycomb body and the outer cylinder should be firmly joined. However, when the whole assembly is rigidly joined by full joints or the like, a large thermal stress occurs in the vicinity of the joints, so that thermal fatigue causes the joint between the outer cylinder and the honeycomb body to be broken or the inside of the honeycomb body to be broken. This in turn causes the honeycomb body to be separated from the outer cylinder, which results in problems in the engine, a lowering in exhaust gas purification activity and the like.

In order to prevent the above unfavorable phenomenon, a method for joining abutted portions between the flat foil and the corrugated foil of the honeycomb body by a method other than full joining has been proposed, and examples thereof include a method disclosed in Japanese Examined Patent Publication (Kokoku) No. 63-44466 wherein only at least one end face of the honeycomb body is brazed and a method disclosed in German Unexamined Patent Publication No. 3,312,944 wherein portions of the flat foil and the corrugated foil to be joined are intermittently brazed.

Brazing, welding and diffusion joining are already known as the method for joining the metallic carrier and the honeycomb body together. In the welding, many joining sites are joined one by one, so that the efficiency is low. For this reason, brazing or diffusion joining is generally used because many joining sites can be simultaneously joined. In particular, brazing has been most commonly used for this purpose for many years.

Brazing is a joining method which comprises: placing a metal (a brazing agent) having a melting point below the base metals to be joined around the joining interface, heating the brazing agent to melt the brazing agent, thereby enabling the melted brazing agent to permeate and fill the gaps in the joining interface without melting the base metal; and conducting cooling and solidification. In this method, a dissimilar phase having a composition different from the base metal and being formed by the brazing agent or a reaction of the brazing agent with the base metal is present in the joint.

In brazing a honeycomb body comprising a 20% Cr-5% Al—Fe alloy steel or the like, a nickel brazing agent composed mainly of Ni is mainly used. This method has not only a problem of cost of the brazing agent but also further problems such as a deterioration in base metal due to an intermetallic compound formed by the reaction between the brazing agent and the base metal component and a reduction in degree of freedom of the joint due to filling and solidification around the joining interface.

Diffusion joining has been studied with a view to solving the above problems of the brazing. The diffusion joining method is classified into a solid-phase diffusion joining method in which the base metals are joined with the solid phase being maintained by taking advantage of diffusion of atoms and a liquid-phase diffusion joining method in which a liquid phase is formed in the joining interface and the base metals are joined together in the liquid phase. Both the above methods are characterized in that after joining, heat treatment is carried out to diffuse and disperse a dissimilar phase formed in the joint interface into the base metals to provide a homogeneous joint.

Both the solid-phase diffusion joining method and the liquid-phase diffusion joining method can be further sub-classified into a method which comprises inserting a metallic film or the like (an insert material) different from the base metals to be joined into the joining interface and conducting heat treatment and a method which uses no insert material.

The solid-phase diffusion joining is a method in which base metals having a clean joining face are brought into close contact with each other by applying a pressure to them and, in this state, are heat-treated in a non-oxidizing atmosphere to cause an adhesion reinforcing process by taking advantage of creep and then mutual diffusion of constituent atoms of the base metal to be joined, thereby joining the base metals. This method is greatly influenced by the cleanness of the joining interface, the state of oxide film, the contact pressure and the like.

In particular, in a steel having a high Al content, such as a 20% Cr-5% Al—Fe alloy steel, a strong and stable Al oxide film is formed in the joining interface, and also regarding the contact pressure, the application of pressure is limited from the viewpoint of deformation and the like because the honeycomb body comprises thin foils having a base metal thickness of about 50 μm.

Japanese Unexamined Patent Publication (Kokai) No. 2-14747 proposes that the diameter of the outer cylinder housing a honeycomb body is reduced to improve the close contact (face pressure) of the contact portion between the flat foil and the corrugated foil, thereby accelerating the solid-phase diffusion joining. In this method, however, since the metallic foil constituting the honeycomb body is so thin that the face pressure of the contact portion can be increased only around the outer cylinder even when the diameter of the outer cylinder is reduced, so that it is difficult to attain satisfactory joining.

Further, in the above method, since joining by very strong press contact of the whole honeycomb body structure is indispensable, this method is suitable for the production of a honeycomb body having a fully joined structure but unsuitable for the production of such a honeycomb body that only particular sites of the inside of the honeycomb body are joined.

The liquid-phase diffusion joining method is generally carried out as follows. Specifically, a metal having a melting point below that of the base metal to be joined is inserted as an insert material into the joining interface and heat-treated to join the base metals together by taking advantage of a reaction between the melted insert metal and the base metals, and the heating temperature is held for a predetermined period of time. The holding causes the components of the joint to be diffused. The composition is changed by the diffusion, and isothermal solidification is carried out by taking advantage of an increase in solidification temperature due to the change in composition by the diffusion. Subsequently, the solidified joint is heated to diffuse and disperse a dissimilar phase formed at the joint into the base metal to form a homogeneous joining interface. The above joining method has a drawback that the diffusion treatment for homogenizing the dissimilar phase at the joint requires a lot of time.

Examples of other joining methods include a method disclosed in Japanese Unexamined Patent Publication (Kokai) Nos. 54-13462 and 63-36843 in which joining is carried out using a high-density energy such as an electron beam or a laser beam, and a method disclosed in Japanese Unexamined Patent Publication (Kokai) No. 54-13462 in which joining is carried out by electric resistance welding. These welding methods are unsuitable when there are many sites to be joined within the honeycomb body. Therefore, there is a limitation on the adoption of the above joining methods when the working efficiency is taken into consideration.

Further, Japanese Unexamined Patent Publication (Kokai) No. 56-85514 discloses joining by sintering, and Japanese Unexamined Patent Publication (Kokai) No. 1-218636 discloses solid-phase diffusion joining.

In the joining by diffusion or sintering, there is a possibility that problems of properties and workability associated with the above joining by brazing or high-density energy could be solved. However, heat treatment for a long period of time and application of pressure to the contact portion are necessary, so that it is difficult to attain satisfactory joining in a cost-effective manner with a high efficiency.

Also with respect to joining between the outer cylinder and the honeycomb body, firm joining of the whole contact portion is inconvenient from the viewpoint of stress relaxation. For this reason, a method in which joining is indirectly carried out through a cushion plate or a mesh net or a method in which only a part of the contact portion between the outer cylinder and the honeycomb body is joined by brazing is adopted. Of them, joining by brazing which enables joining of the honeycomb body and joining of the outer cylinder to be simultaneously carried out is superior in efficiency.

The present invention can solve the above problems associated with joining between metallic foils constituting the honeycomb body.

DISCLOSURE OF INVENTION

A major object of the present invention is to provide a novel method for joining metallic foils of a honeycomb body in a metallic carrier together without the use of the conventional welding or brazing processes.

Another object of the present invention is to provide an efficient, cost-effective joining method by significantly alleviating various conditions for the removal of an oxide film on the surface of metallic foils, application of a high face pressure, heat treatment for a long period of time and the like in the diffusion of components of the joint by the diffusion joining process.

A further object of the present invention is to provide a honeycomb body having a favorable joint structure.

Means for attaining the above objects will now be described in detail.

According to the present invention, a joining agent prepared by mixing and dispersing a joining accelerator comprising a carbon powder in an adhesive, for example, a liquid or a paste of an organic binder, such as polyvinyl alcohol (PVA), dissolved in a solvent is supplied into joining portions between a flat foil and a corrugated foil of a honeycomb body comprising a ferritic heat resisting alloy steel, dried and solidified and heated in a non-oxidizing atmosphere to join the foils to each other.

In metallic foils, particularly metallic foils of a ferritic high alloy steel containing Al at their portions to be joined, the joining accelerator reduces and decomposes an oxide film on the surface of the metallic foils to accelerate diffusion between the metallic foils (diffusion of various atoms constituting the metallic foils), so that joining under a high pressure between the foils is unnecessary as opposed to the solid-phase diffusion joining.

Further, the joining accelerator diffuses into the base metal of the metallic foil to lower the melting point of the metallic foil in its portion around the joining interface, thereby forming a liquid phase in the joining interface. Therefore, a joint can be surely provided by making use of the liquid phase.

Carbon atoms diffused into the foil metal form iron and chromium carbides (a dissimilar component phase) within the joint. However, the dissimilar component phase has substantially no adverse effect on corrosion resistance and heat resistance, so that the step of homogenizing diffusion by heating is not required as opposed to the liquid-phase diffusion joining method. Therefore, in the present invention, the joint can be solidified by conducting cooling immediately after joining. This enables the heat treatment time to be shortened significantly.

Artificial graphite, natural graphite or the like, which is easily commercially available, may be used as the carbon powder. In particular, natural graphite containing a suitable amount of silicon, aluminum or the like has an excellent effect to accelerate joining and is advantageous also from the viewpoint of cost, so that it is excellent as a joining accelerator in the present invention.

As described above, carbides are precipitated as a dissimilar component phase in the joining interface. However, for example, in the case of a high chromium stainless steel foil, such as a 20% Cr-5% Al—Fe alloy steel, a lowering in corrosion resistance caused by a lowering in Cr concentration around the precipitate raises no problem in practical use, and since the precipitate is present in such a state that it is surrounded by a soft base metal comprising small grains, hardening of the whole foil material, cracking starting from the precipitate and other unfavorable phenomena substantially do not occur.

As described above, the present invention relates to a novel joining method wherein joining is carried out by melting the joining interface alone by virtue of the action of carbon without use of any expensive brazing agent and cooling and solidification are carried out without conducting homogenization of components by heating (hereinafter referred to as "liquid-phase joining") and is characterized in that ① a carbon powder, which is not a metal, is used as a joining accelerator, as an addition like an insertion used in the diffusion joining method, ② the joining accelerator, as such, is hardly melted or liquefied and reacts with the joining base metal to melt the joining interface alone, thereby conducting joining, and ③ cooling and solidification are carried out without diffusing and homogenizing a dissimilar phase formed at the joining interface. The joining method according to the present invention is a novel joining method which is different from the brazing joining method or the diffusion joining method and can produce a honeycomb body having surely joined portions with a high efficiency in a cost-effective manner.

BEST MODE FOR CARRYING OUT THE INVENTION

Metallic foils for a honeycomb body contemplated in the present invention, that is, a flat foil and a corrugated foil, comprise a ferritic stainless steel, particularly an alloy steel having excellent heat resistance and oxidation resistance containing Al, for example, a 20% Cr-5% Al—Fe alloy.

An example of the composition of the above alloy steel will be given in the following table.

| C | Si | Mn | Cr | Ti | N | Al | REM | (wt. %) Fe |
|---|---|---|---|---|---|---|---|---|
| Not more than 0.010 | Not more than 1.00 | Not more than 1.00 | 19.5 to 20.5 | 0.02 to 0.10 | Not more than 0.010 | 4.8 to 5.2 | 0.07 to 0.11 | Balance |

The above alloy steel, of course, includes alloy steels further comprising Ta, Mo, W, Nb, Y and the like.

In the present invention, a joining accelerator is used for the purpose of joining the above metallic foils. The joining accelerator is a carbon powder. The carbon powder comprises at least one carbon material selected from artificial graphite, natural flaky graphite, pyrolytic graphite, petroleum coke, carbon black and the like, and the carbon powder is preferably fine from the viewpoint of accelerating the homogenization of coating and the diffusion of the carbon atom into the base metal.

Upon heating to a high temperature, the carbon powder is diffused into the base metal (at the abutted portion to be joined) coated with the carbon powder to lower the melting temperature of the base metal. When the base metal is a ferritic stainless steel, the carbon powder lowers the melting temperature from not less than 1300° C. to the range from 1100° to 1300° C. (melting initiation temperature).

Thus, carbon brings the base metal to a liquid state at a lower temperature than the melting temperature, so that the joints of the flat foil and the corrugated foil can be easily melt-joined. Carbon, as such, reacts with Cr and Fe within the base metal to form carbides of these elements and, at the same time, reduces an oxide present on the surface of the metallic foils to form $CO_2$ and CO which are released into the atmosphere, so that the joining interface is cleaned.

Therefore, the carbon powder should have heat resistance enough to exist without decomposition until the temperature reaches the above melting initiation temperature. The carbon powder is not limited to the above-described carbon materials so long as it is a carbon material having the above described properties.

The control of the supply of the joining accelerator is very important for attaining the above effect. When the amount of the joining accelerator supplied is excessively large, a deformation of the honeycomb body and, further, melt loss occur. On the other hand, when the amount of the joining accelerator supplied is excessively small, no liquid phase appears in the joining interface, so that no satisfactory effect can be attained. For this reason, it is preferred to supply a particulate joining accelerator having a particle diameter of not more than about 5 μm, preferably in the range from 1 to 3 μm, in an amount of 0.001 to 0.016 mg/mm$^2$ (i.e., per unit area of each diffusion point).

The above-described joining accelerator is used in combination with an adhesive comprising an organic binder, for example, polyvinyl alcohol or dextrin or other pressure sensitive adhesives, dissolved in a solvent. Examples of methods for combining the joining accelerator with the adhesive include a method which comprises previously coating to joints with an adhesive and spreading a powdery joining acceleratorz on the coated portions, a method which comprises spreading a joining accelerator on the surface of a tape coated with an adhesive and adhering the tape onto joints and a method which comprises mixing a joining accelerator with an adhesive to form a liquid or paste joining agent which is coated on joints.

The organic binder is preferably soluble in water. This is because when the binder is soluble in a volatile organic solvent only, the evaporation of the solvent causes a change in concentration and deteriorates the work environment.

A specific method for supplying the joint accelerator to the metallic foils of the honeycomb body is a brazing agent supplying method described in Japanese Unexamined Patent Publication (Kokai) No. 56-4373 which comprises supplying a paste or liquid joining agent formed by mixing or dispersing an joining accelerator in an adhesive into metallic foils to joints by means of a roll coater and stacking or winding up the metallic foils to form a honeycomb body.

Alternatively, it is possible to use a method which comprises stacking or winding up a metallic flat foil and a corrugated foil to form a honeycomb body and immersing the honeycomb body in a liquid joining agent with a joining accelerator being mixed and dispersed therein, thereby supplying the joining accelerator to a region to be joined.

Furthermore, it is also possible to adopt a method which comprises stacking or winding up the metallic foils to form a honeycomb body, immersing the honeycomb body into an adhesive and then supplying a powdery joining accelerator and a brazing agent supplying method described in Japanese Unexamined Patent Publication (Kokai) No. 2-19843 which comprises supplying an adhesive to predetermined sites of the metallic foils using a roll coater or the like, stacking or winding up the metallic foils to form a honeycomb body and then supplying a powdery joining accelerator. The roller coating method is best suited for limited coating to the joining interface only.

Thus, the joining accelerator is supplied with an adhesive, dried and then heated in a non-oxidizing atmosphere to conduct joining. In this case, in order to attain satisfactory joining, it is preferred to closely contact the metallic foils at their contact surfaces with each other. For this reason, in the formation of a honeycomb body, stacking or winding is carried out so that sufficient face pressure can be applied to the metallic foils at their contact surface. In general, when a honeycomb body is formed by the roll coater method, it is formed while applying a back tension to the flat foil. For example, in the case of the solid-phase diffusion joining, a back tension of about 15 to 20 kg per 100 mm of foil width is required.

However, in the liquid-phase joining method according to the present invention, since a joining accelerator is used, the above-described back tension can be reduced to about 5 to 10 kg.

In the application of a face pressure after the formation of the honeycomb body, the contact can be ensured to some extent by known methods, such as a method in which a honeycomb body formed by stacking or winding is tentatively welded and a proper fixture for pressing is then used. The application of the face pressure in this method, however, is not satisfactory.

Preferably, as described in Japanese Unexamined Patent Publication (Kokai) No. 2-268834, after a honeycomb body is inserted into an outer cylinder, the contact is ensured by using a method for reducing the diameter of the outer cylinder. This method is advantageous particularly when the metallic carrier comprises an outer cylinder and a honeycomb body as described below.

Thus, a joining accelerator is supplied, a necessary face pressure is ensured, and heating is carried out in the non-oxidizing atmosphere to join the metallic foils to each other, thereby producing a honeycomb body.

The heating should be carried out in the non-oxidizing atmosphere from the viewpoint of avoiding the formation of an oxide film which inhibits joining.

In the portion between the corrugated foil and the flat foil joined by the above joining method, the base metals at their abutted portions are melted and integrated with each other. A fine chromium carbide is precipitated in such a state that it is wrapped with the structure of the melt-joined portion.

The chromium carbide has a hardness of about HV400 on the average. However, despite the aggregation and precipitation of the chromium carbide, the hardness of the melt-jointed portion is not substantially different from that of the metallic foil per se.

The joint structure is quite a novel structure, and a joined portion having a very high joint strength can be provided without substantial cracking derived from the hardness or starting from the precipitate even when the precipitate is not homogeneously dispersed by heating at a high temperature for a long period of time or other means.

The process for producing a metallic carrier according to the present invention will now be described with reference to the accompanying drawings.

Figure 1:
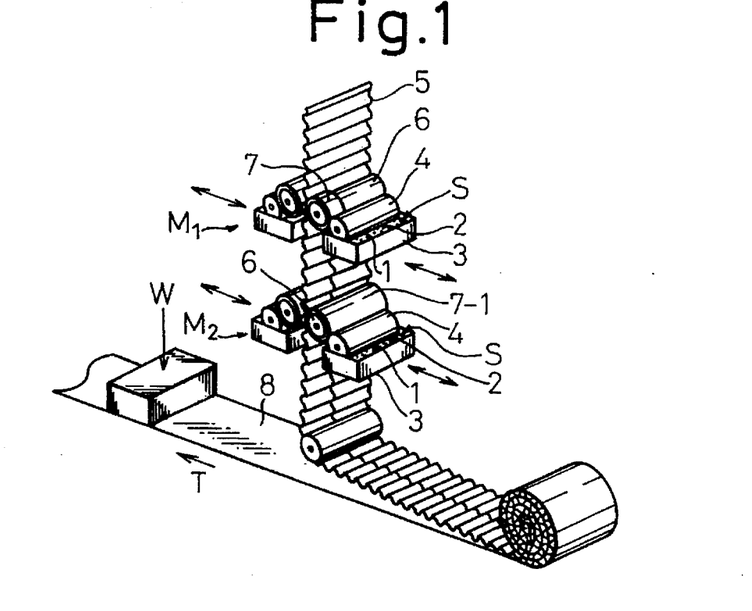
FIG. 1 is a schematic perspective view showing an embodiment of a process for producing the honeycomb body of the present invention.
Figure 2A:
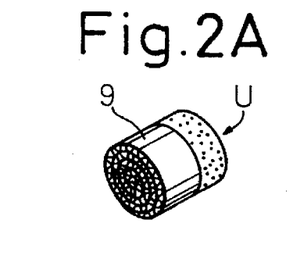
FIG. 2A is a diagram showing an embodiment of coating of a joining agent on the outside surface of a honeycomb body in the step of inserting the honeycomb body of the present invention into an outer cylinder.
Figure 2B:
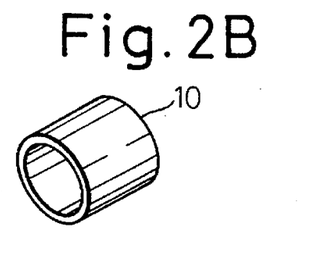
FIG. 2B is a diagram showing an embodiment of inserting the above honeycomb body into the outer cylinder in the above step.
Figure 2C:
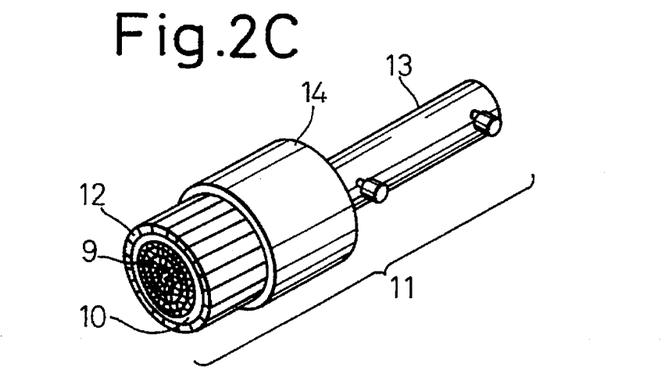
FIG. 2C is a diagram showing an embodiment of inserting the carrier shown in FIG. 2B into a pipe diameter reducing device and reducing a diameter thereof in the above step.

FIGS. 1 and 2 are schematic diagrams showing a representative embodiment of the production process according to the present invention. In an upper coater M1 shown in FIG. 1, a liquid joining agent S comprising a blend of an adhesive 2 with a joining accelerator 1 (a particulate carbon powder) is inserted in a vessel 3. A sink roll 4 is immersed in the liquid joining agent S, and the liquid joining agent S deposited on the surface of the sink roll 4 is transferred to a coating roll 6 rotated in synchronism with the travel of a corrugated foil 5. A coating ring 7 is previously provided on a part of the surface of the coating roll 6 so that the liquid joining agent S can be transferred and coated onto predetermined sites of the corrugated foil. A coater M2 provided with a coating ring 7-1 on substantially the whole surface of the coating roll 6 instead of the coating ring 7 of the coater M1 is provided under the upper coater M1.

The position of coating onto the corrugated foil can be freely controlled by varying the mounting position of the coating ring 7 or 7-1, the number of rolls provided and the timing of contact of the coating roll 6 with the corrugated foil.

Figure 7:
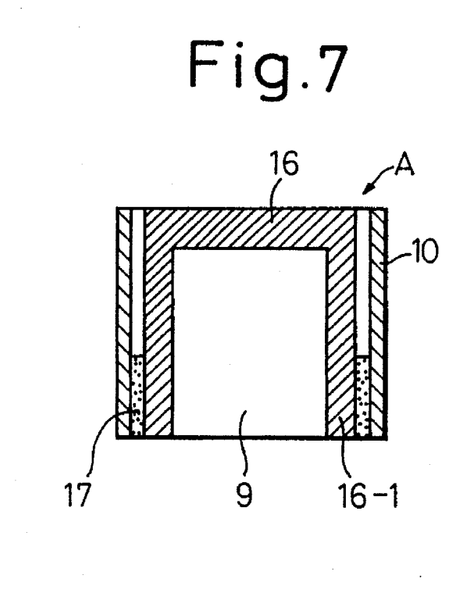
FIG. 7 is a cross-sectional view of a metallic carrier produced through the steps shown in FIG. 1 and FIGS. 2A to 2C.

In the embodiment shown in FIG. 1, the liquid joining agent S is coated by means of the upper coater M1 on an upper end 16 of a honeycomb body shown in FIG. 7 over the whole length of the corrugated foil. On the other hand, in the lower coater M2, the timing of contact of the coating roll 6 with the corrugated foil is varied, and the coating ring 7-1 is brought into contact with a gang layer just before the completion of winding to coat the liquid joining agent S on the whole surface of the corrugated foil.

The coating rings 7 and 7-1 each suitably comprise a flexible and highly water-absorptive material such as a sponge cloth for a wet suit. However, the material is not limited to this only.

The corrugated foil 5 coated with the liquid joining agent S and a flat foil 8 with a back tension T applied in the rear of the flat foil 8 by applying a load W are put on top of the other, and the laminate is rolled up to form a honeycomb body 9. After the completion of the rolling, the foils at their terminal ends are joined to the outer periphery of the honeycomb body by spot welding to prevent loosening.

Then, as shown in FIG. 2A, a coating agent U comprising a blend of an organic binder with a powdery brazing agent is coated on predetermined sites of the outer surface of the honeycomb body 9, and as shown in FIG. 2B, the coated honeycomb body is inserted into an outer cylinder 10. Thereafter, as shown in FIG. 2C, the diameter of the outer cylinder 10 housing the honeycomb body 9 is reduced by means of a pipe diameter reducing machine 11 to increase the close contact between the flat foil 8 and the corrugated foil 5 within the honeycomb body 9 and between the honeycomb body and the outer cylinder 10.

The honeycomb body 9 which has been inserted and brought into close contact with the outer cylinder 10 is dried at a temperature of about 150° C. to remove water and, at the same time, to solidify the organic binder U and heated in the non-oxidizing atmosphere to conduct bonding of the honeycomb body in a liquid phase and, at the same time, to braze the honeycomb body to the outer cylinder, thereby producing a metallic carrier.

In the heat treatment in the non-oxidizing atmosphere, it is possible to utilize the hydrogen atmosphere or the high vacuum atmosphere. However, heat treatment in the high vacuum atmosphere in the range from about $3 \times 10^{-3}$ to $3 \times 10^{-3}$ Torr to $5 \times 10^{-5}$ to $5 \times 10^{-5}$ Torr is preferred from the viewpoint of workability.

In the above heat treatment in the above atmosphere, the assembly is heated to the temperature range from 1000° to 1300° C. at a temperature rise rate of 5° to 30° C./sec, held at that temperature for 30 to 120 min and then cooled to room temperature at an average cooling rate of about 10° to 30° C./min.

The pipe diameter reducing machine 11 may be such that, as described in Japanese Unexamined Patent Publication (Kokai) No. 2-268834, a group of segments 12 designed so as to enter a die 14 house the outer cylinder 10 and the segments 12 are pulled into the internal surface of a die 14 by means of a hydraulic cylinder 13 to reduce the diameter of the outer cylinder 10. The diameter reduction method is not limited to this only, and when a brazing agent in a foil form is used for joining the honeycomb body to the outer cylinder, a method in which the formed honeycomb body, as such, is press-fitted into the outer cylinder is also useful.

Examples of organic binders used as an adhesive in the powdery brazing agent include PVA (polyvinyl alcohol), dextrin and various pressure-sensitive adhesives, and nickel brazing agents specified in JIS-Z-3265 can be used as a powdery brazing agent to be blended with the organic binder.

EXAMPLES

Example 1

A flat foil and a corrugated foil were put on top of the other and wound up while being coated, by a method as shown in FIG. 1, with a liquid joining agent S comprising an adhesive 2 and a joining accelerator 1 mixed and dispersed in the adhesive at a position 20 mm from the upper end face of a honeycomb body in the axial direction and in a range from the outermost layer to the two or three inner layers, of the honeycomb, at the same time, while applying a back tension T, thereby forming a honeycomb body 9 having a diameter of 82.0 mm and a height of 100 mm, and the outmost flat foil at its winding end was fixed to the honeycomb body 9 by spot welding.

A coating agent U comprising an adhesive and a powdery brazing agent mixed and dispersed in the adhesive was coated on the outermost layer of the honeycomb body for 50 mm in the axial direction from the lower end face of the honeycomb body and inserted into an outer cylinder having an outer diameter of 86 mm and a wall thickness of 1.5 mm. The diameter of the outer cylinder 10 with the honeycomb body being inserted therein was reduced to 84.0 mm by means of a pipe diameter reducing machine 11 shown in FIG. 2C, thereby fixing the honeycomb body to the outer cylinder, and the assembly was then dried and heat-treated in the vacuum atmosphere to prepare a metallic carrier A shown in FIG. 7.

FIG. 7 is a vertical section of the metallic carrier A. In the drawing, numeral 16 designates an area on which the joining agent was coated from the upper end face of the honeycomb body towards the inside of the honeycomb body in the axial direction, and numeral 16-1 designates an area on which a joining agent was coated from the outer periphery of the honeycomb body towards the inner layer. Numeral 17 designates an area on which the coating agent U was coated.

In the honeycomb body, each of the flat foil and the corrugated foil comprised a 20% Cr-5% Al—Fe steel specified in the following table which is a ferritic stainless steel.

| | | | | | | | | (wt. %) |
| C | Si | Mn | Cr | Ti | N | Al | REM | Fe |
| --- | --- | --- | --- | --- | --- | --- | --- | --- |
| 0.005 | 0.35 | 0.16 | 20.0 | 0.06 | 0.007 | 5.0 | 0.088 | Balance |

The joining accelerator comprised a flaky graphite having a particle diameter in the range from about 1 to 3 μm. It was mixed and dispersed in an adhesive prepared by dissolving an organic binder composed mainly of a water-soluble thermosetting polymer in a solvent to prepare a liquid joining agent having a graphite concentration of about 20% by weight.

Regarding the back tension T, a tension of about 10 kg per 100 mm of the foil width was applied to the flat foil by applying a load W in the rear of the flat foil.

The honeycomb body and the outer cylinder were joined as follows. A nickel-based powdery brazing agent (Nicrobraz#30 (corresponding to JIS-Z-3265 BNi-5)) was mixed and dispersed in an adhesive with an organic binder being dissolved therein to prepare a paste which was coated on predetermined sites of the outer periphery of the honeycomb body. The coated honeycomb body was inserted into the outer cylinder, and the diameter of the outer cylinder was reduced to fix the honeycomb body to the outer cylinder.

The honeycomb body inserted into the outer cylinder was heated, to 1250° C., at a temperature rise rate of about 20° C./min in a vacuum atmosphere of $3 \times 10^{-4}$ to $5 \times 10^{-4}$ Torr, held at that temperature for 90 min and cooled to room temperature at an average cooling rate of about 15° C./min by the gas fan cooling method (wherein nitrogen gas is introduced into the vacuum oven being heated to raise the temperature to return the vacuum to atmospheric pressure and the atmosphere in the oven filled with the nitrogen gas is cooled by stirring by means of a fan).

In this case, the total vacuum heat treatment time required was about 4 hr.

The metallic carrier thus obtained was cut in round slices at a position of 20 mm and 40 mm from the upper end face in the axial direction to prepare a sample. The sample was subjected to a punching test to observe the broken portion. As a result, the broken portion of the portion joined by the making use of the liquid phase located at a position 20 mm from the upper part was not the abutted portion between the flat foil and the corrugated foil but the base metal portion of the metallic foil. That is, a complete joining could be obtained. On the other hand, in the portion not coated with the joining agent located at a position of 20 to 40 mm from the upper part, the abutted portion between the flat foil and the corrugated foil was peeled off. That is, it was confirmed that only partial joining within the honeycomb body could be attained.

The metallic carrier prepared in the present example was subjected to a thermal cycle test under the following conditions.

Thermal cycle test conditions: The metallic carrier was heated to 900° C. using a coke oven gas as a fuel, held at that temperature for 5 min and cooled to room temperature. This cycle was repeated 2000 times.

In the above thermal cycle test, no abnormal phenomenon was observed, and the metallic carrier could successfully pass the thermal cycle test.

Figure 10:
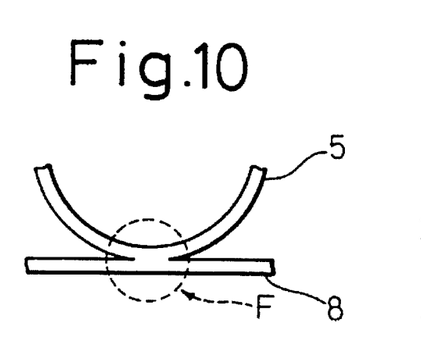
FIG. 10 is a diagram showing a joint according to the present invention and FIG. 11 is a photomicrograph showing a metallic structure of portion F shown in FIG. 10.
Figure 11:
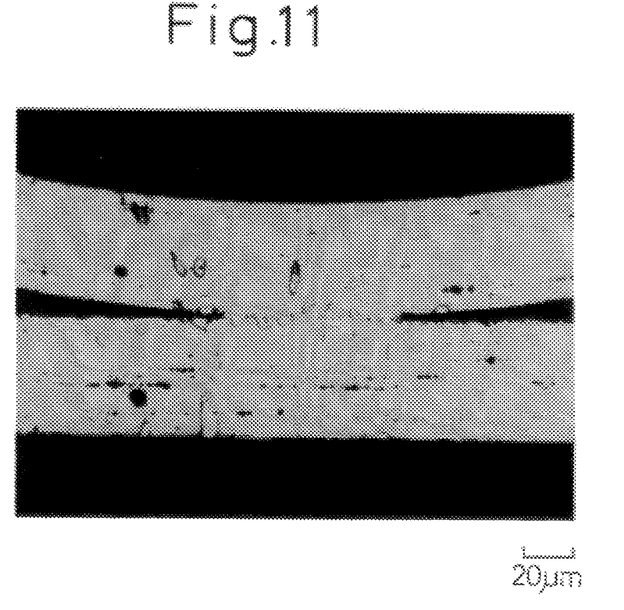

As shown in FIG. 10, in the joined portion F between the flat foil 8 and the corrugated foil 5 of the metallic carrier prepared in the present example, the base metals at the abutted portion between the flat foil and the corrugated foil were fused, and the joined portion had the same appearance as the joined portion of a carrier joined by the liquid-phase diffusion joining method. However, as is apparent from FIG. 11, which is an enlarged view of the inside of the joined portion F, although the base metals of the flat foil and the corrugated foil at the joined portion were completely fused, the precipitation of a fine Cr carbide was observed around the abutted portion between both the metallic foils. The Cr carbide had a HV hardness of about 400 on the average. The Cr carbide is fine because the particle diameter of the joining accelerator is not more than 5 μm. The HV hardness 180 to 200 of the base metal surrounding the Cr carbide remained substantially unchanged.

Example 2

Figure 3:
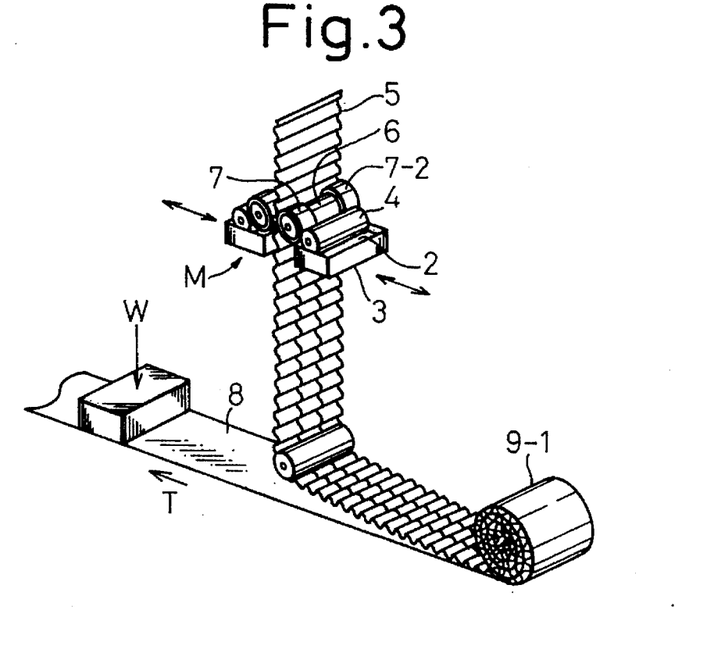
FIG. 3 is a schematic perspective view showing another embodiment of a process for producing the honeycomb body of the present invention.

As shown in FIG. 3, a flat foil 8 and a corrugated foil 5 were put on top of the other and wound up together while coating, using an adhesive coater M provided with coating rings 7 and 7-2 respectively on both ends of a coating roll 6, an adhesive 2 on the corrugated foil 5 at 20 mm from the both end portions in the widthwise direction of the corrugated foil 5 towards the inner part, thereby forming a honeycomb body 9-1. The other conditions for the formation of the honeycomb body were the same as those used in Example 1.

Figure 4:
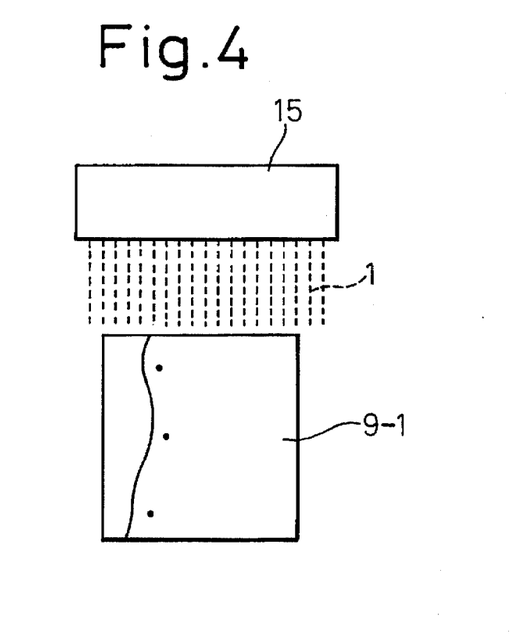
FIG. 4 is a diagram showing an embodiment of spreading the joining accelerator according to the present invention.

Then, a joining accelerator 1 was spread by means of a spreading device shown in FIG. 4 and adhered on the honeycomb body in its portions where the adhesive had been coated, and a coating agent U prepared by mixing and dispersing a powdery brazing agent in an adhesive was coated on the outer periphery of the honeycomb body by 50 mm in its axial center portion. The honeycomb body was then inserted into the outer cylinder 10 as described in Example 1, and the assembly was heat-treated to prepare a metallic carrier B as shown in FIG. 8.

In this case, the total vacuum heat treatment time required was about 4 hr.

Figure 8:
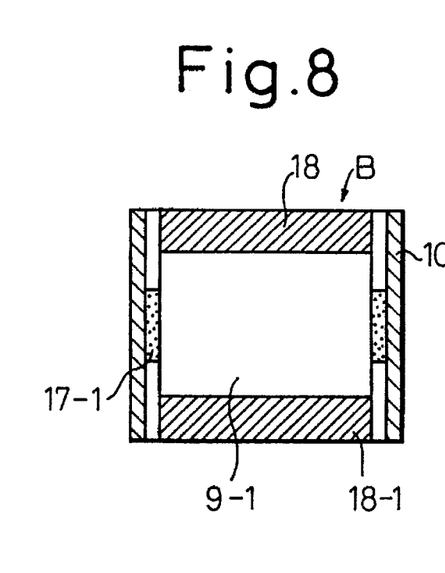
FIG. 8 is a cross-sectional view of a metallic carrier produced through the steps shown in FIGS. 3 and 4 and FIGS. 2A to 2C.

FIG. 8 is a vertical section of the metallic carrier. Numerals 18 and 18-1 each designate an area on which the joining agent was coated, and numeral 17-1 designates an area on which the coating agent U was coated.

The metallic carrier thus obtained was cut in round slices in the direction of the diameter at positions of 20 mm respectively from the upper and lower end faces in the axial direction to prepare a sample. The sample was subjected to a punching test to observe the broken portion. As a result, the broken portion was not the abutted portion between the flat foil and the corrugated foil but the base metal portion of the metallic foil. That is, a complete joint could be obtained.

Further, the above carrier was subjected to a thermal cycle test as described in Example 1. As a result, no abnormal phenomenon was observed in the carrier, and the carrier could successfully pass the thermal cycle test.

Example 3

Figure 5:
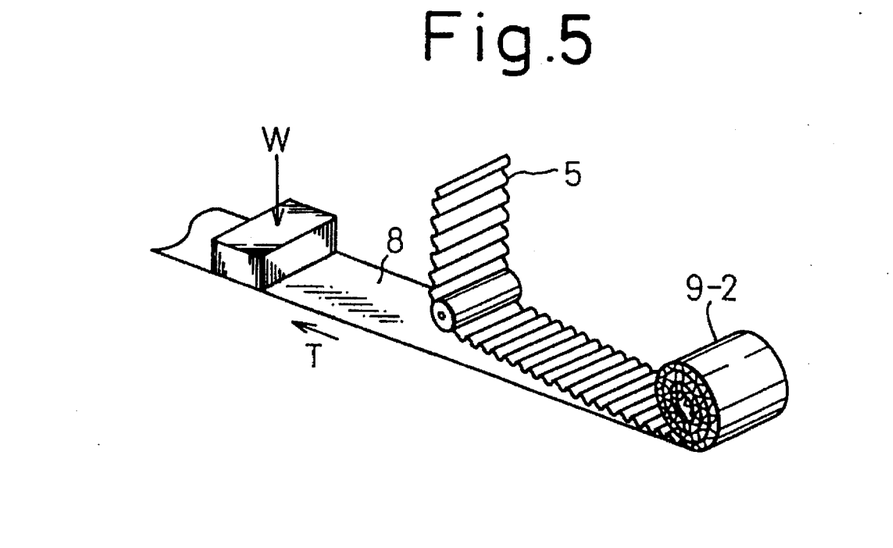
FIG. 5 is a schematic perspective view showing a still further embodiment of a process for producing the honeycomb body of the present invention.

As shown in FIG. 5, a flat foil 8 and a corrugated foil 5 were wound up together to form a honeycomb body 9-2. The honeycomb body 9-2 was immersed in a vessel 15-1 containing a liquid joining agent S shown in FIG. 6. The liquid joining agent S rose through the gap of the abutted portion between the flat foil 8 and the corrugated portion 5 by capillary action, so that it was coated on the whole area of the abutted portion between both the foils.

Figure 6:
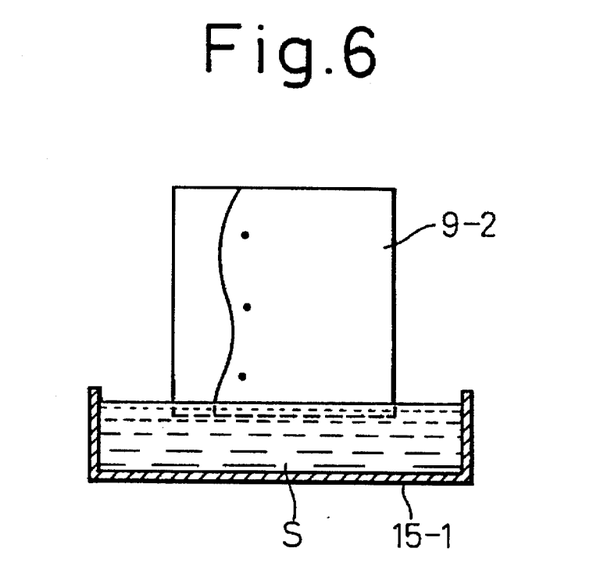
FIG. 6 is a partially sectional view of an embodiment wherein the honeycomb body produced in the embodiment shown in FIG. 5 is immersed in a liquid joining agent of the present invention contained in a vessel.

In this case, in order to facilitate the rise of the liquid joining agent S through the gap of the abutted portion between both the foils, a surfactant was added to the liquid joining agent S to improve the wettability of the surface of the foils by the liquid joining agent.

Figure 9:
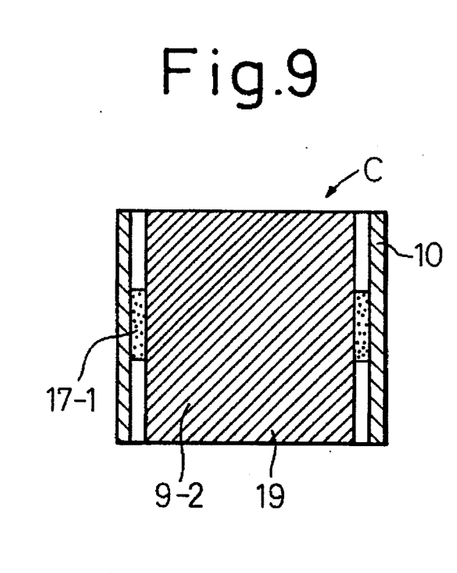
FIG. 9 is a cross-sectional view of a metallic carrier produced through the steps shown in FIGS. 5 and 6 and FIGS. 2A to 2C.

A coating agent U was coated on the outer periphery of the honeycomb body in its axial center portion as described in Example 2. Then, the honeycomb body was inserted into an outer cylinder 10, and the assembly was heat-treated as described in Example 1 to prepare a metallic carrier shown in FIG. 9. In the drawing, numeral 19 designates an area on which the liquid joining agent S was coated.

In this case, the total vacuum heat treatment time required was 4 hr.

The metallic carrier thus obtained is useful when the service temperature is low.

The metallic carrier thus obtained was cut in round slices in the direction of the diameter at a position of 20 mm from the upper end face in the axial direction to prepare a sample. The sample was subjected to a punching test to observe the broken portion. As a result, the broken portion was not the abutted portion between the flat foil and the corrugated foil but the base metal portion of the metallic foil. That is, a complete joint could be obtained.

Further, the metallic carrier was subjected to a thermal cycle test wherein a cycle comprising heating the metallic carrier to 800° C., holding the metallic carrier at that temperature for 5 min and cooling the metallic carrier to room temperature was repeated 2000 times using as a fuel a coke oven gas. As a result, no abnormal phenomenon was observed in the carrier, and the carrier could successfully pass the thermal cycle test.

Comparative Example 1

The procedure of the example was repeated to prepare a honeycomb body. Specifically, a flat foil and a corrugated foil were wound up together while coating, by a method shown in FIG. 3, an adhesive 2 on a corrugated foil by 20 mm from the both end portions in the widthwise direction of the corrugated foil towards the inner part, thereby forming a honeycomb body. A powdery brazing agent was spread on the honeycomb body to adhere the powdery brazing agent to the adhesive. Thereafter, a powdery brazing agent was coated on the outer surface of the honeycomb body by 50 mm in its axial center portion as described in the example. Then, the honeycomb body was inserted into the outer cylinder, dried and subjected to heat treatment in a vacuum to prepare a metallic carrier.

In the present comparative example, the heat treatment in a vacuum was carried out under the following conditions by taking into consideration the melting and solidification properties of the brazing agent. Specifically, the assembly was heated from room temperature to 600° C. at a temperature rise rate of about 20° C./min, held at that temperature for 50 min to emit a gas derived from the decomposition of the organic binder and the like, subsequently heated to 900° C. at a temperature rise rate of 15° C./min while increasing the degree of vacuum, held at that temperature for 20 min to soak the charge, subsequently heated to 1200° C. at a temperature rise rate of 10° C./min, held at that temperature for 20 min while maintaining the vacuum $3\times10^{-4}$ to $5\times10^{-4}$ Torr to melt and penetrate the brazing agent. Then, the assembly was subjected to furnace cooling to 1000° C. to solidify the melted brazing agent and then cooled from that temperature to room temperature by the gas fan cooling method as described in the previous example.

In this case, the total vacuum heating treatment time required was about 5.8 hr.

The powdery brazing agent used was Nicrobraz#30 (trade name).

The metallic carrier thus obtained was cut in round slices in the direction of the diameter at positions 20 mm from the upper and lower end faces in the axial direction to prepare a sample. The sample was subjected to a punching test to observe the broken portion. As a result, the broken portion was not the abutted portion between the flat foil and the corrugated foil but the base metal portion of the metallic foil. That is, a complete joining could be obtained.

Figure 12:
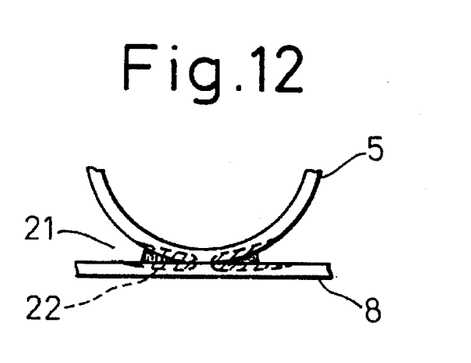
FIG. 12 is a diagram showing a joint of a carrier formed by brazing (prior Art).

However, in the joined portion in the present comparative example, as shown in FIG. 12, a brazing agent was filled in the vicinity of the abutted portion between the flat foil 8 and the corrugated foil 5 to join the abutted portion by a brazing agent bridge 21, so that a change in composition was observed in a base metal region 22 of the metallic foil in contact with the brazing agent bridge 21.

Specifically, in this region, aluminum reacted with nickel in the brazing agent to cause a change in composition, which resulted in an increase in the hardness of the base metal from HV 180 to 200 (original base metal) to HV 400 to 500 and, at the same time, a lowering in aluminum content of the metallic foil within this region due to the reaction. When the above carrier was subjected to a thermal cycle test as described in Example 1, cracking occurred from a boundary between regions where the hardness is varied, so that slippage of the honeycomb body occurred in the axial direction and, at the same time, the corrosion resistance was remarkably deteriorated.

Comparative Example 2

The procedure of Example 3 was repeated to wind up a flat foil and a corrugated foil together by a method shown in FIG. 5, thereby preparing a honeycomb body. The honeycomb body was inserted into an outer cylinder and heat-treated in vacuum as described in Example 1, thereby preparing a metallic carrier.

In order to increase the joint strength between the flat foil and the corrugated foil, the back tension T was increased to 20 kg in the production of the honeycomb body. Further, the heat treatment in vacuum was carried out under the following conditions by taking into consideration the solid-phase diffusion.

The assembly was heated from room temperature to 900° C. at a temperature rise rate of about 20° C./min, held at that temperature for 50 min to increase the joint strength by taking advantage of creep, subsequently heated to 1300° C. at a temperature rise rate of 12° C./min, held at that temperature for 120 min to conduct diffusion joining, then subjected to furnace cooling to 1000° C. and cooled from that temperature to room temperature by the gas fan cooling method as described in Example 1.

In this case, the total vacuum heat treatment time required was about 6.5 hr.

The metallic carrier thus obtained was cut in round slices in the direction of the diameter at a position of 20 mm from the upper end face in the axial direction to prepare a sample. The sample was subjected to a punching test to observe the broken portion. As a result, it was found that breaking occurred mainly due to peeling at the abutted portion between the flat foil and the corrugated foil, that is, the joining was incomplete.

The above metallic carrier was then subjected to a thermal cycle test under the same conditions as those described in Example 1. As a result, in the thermal cycle test, partial defects and foil breaking of the honeycomb body occurred, so that the metallic carrier failed to pass the thermal cycle test.

As is apparent also from the above examples, according to the present invention, metallic carriers having a satisfactory joint strength can be efficiently produced without conducting heat treatment after coating of the joining agent at a high temperature for a long period of time or an operation for remarkably reducing the diameter of the outer cylinder.

[Industrial Applicability]

As described above, according to the present invention, a metallic honeycomb body having a satisfactory joint strength can be efficiently produced without conducting heat treatment at a high temperature for a long period of time or an operation for remarkably reducing the diameter of the outer cylinder by virtue of the use of an inexpensive joining accelerator. Further, in the joint of the honeycomb body to the outer cylinder, it is possible to adopt a pattern joint structure in which predetermined positions only are partially joined, which enables the outer cylinder and the honeycomb body to be joined to each other at the optimal joint positions, so that a metallic carrier having a very good quality can be produced with a high efficiency.

We claim:

1. A metallic honeycomb body for supporting a catalyst for automobiles, comprising flat foils of a ferritic heat-resisting high alloy steel containing aluminum in an amount sufficient to form a stable Al oxide film and corrugated foils formed by corrugating said flat foil with said flat foils and said corrugated foils being alternately stacked or the flat foil and the corrugated foil being wound up together and joined to each other, wherein joined portions between said flat foil and said corrugated foil formed by melting and solidification are ferritic, and Fe—Cr carbide is precipitated and dispersed within said joined portions;

wherein said joined portions are formed by coating abutting portions of said flat foil and said corrugated foil with an adhesive with carbon powder added to said adhesive in an amount of 0.001 to 0.016 mg/mm$^2$ (unit area of each joint point) and wherein said carbon powder has a particle diameter of not more than 5 μm.

2. A metallic honeycomb body according to claim 1, wherein said joined portions have a hardness substantially equal to that of the base metal.

3. A process for producing a metallic honeycomb body for supporting a catalyst for automobiles, comprising the step of alternately stacking flat foils of a ferritic heat-resisting high alloy steel containing Al in an amount sufficient to form a stable Al oxide film and corrugated foils formed by corrugating said flat foils, or winding up together the flat foil and the corrugated foil, wherein said metallic honeycomb body is formed while coating one or both of the abutted portions between said flat foil and said corrugated foil with a liquid or paste joining agent comprising an adhesive and a carbon powder mixed and dispersed in the adhesive or after a metallic honeycomb body is formed while coating one or both of the abutted portions between said flat foil and said corrugated foil with an adhesive, a carbon powder is supplied into said abutted portions; wherein said carbon powder is added to said adhesive in an amount of 0.001 to 0.016 mg/mm$^2$ (unit area of each joint point) and wherein said carbon powder has a particle diameter of not more than 5 μm; and said metallic honeycomb body is then heat-treated in a non-oxidizing atmosphere to melt-join joint portions between said flat foil and said corrugated foil.

4. The process according to claim 3, wherein said carbon powder is at least one powder selected from powders of artificial graphite, natural graphite, pyrolytic graphite, petroleum coke and carbon black.

5. The process according to claim 3, wherein said non-oxidizing atmosphere is vacuum or a protective gas atmosphere.

6. The process according to claim 3, wherein said metallic honeycomb body is heated in a non-oxidizing atmosphere at a temperature in the range from 1000° to 1300° C., held at that temperature for 30 to 120 min and then cooled.

7. The process according to claim 3, wherein said adhesive comprises an organic binder dissolved in a solvent.

8. The process according to claim 3, wherein said non-oxidizing atmosphere is a protective gas selected from a group consisting of hydrogen and argon.

9. A process for producing a metallic honeycomb body for supporting a catalyst for automobiles, comprising the steps of: alternately stacking flat foils of a ferritic heat-resisting high alloy steel containing Al in an amount sufficient to form a stable Al oxide film and corrugated foils formed by corrugating said flat foils or winding up together the flat foil and the corrugated foil to form a metallic honeycomb body; either immersing said metallic honeycomb body in a liquid joining agent comprising an adhesive and a carbon powder mixed and dispersed in said adhesive to supply said joining agent to abutted portions between said flat foil and said corrugated foil or, after said metallic honeycomb body is immersed in a liquid adhesive to supply said adhesive into abutted portions between said flat foil and said corrugated foil, supplying a carbon powder into said abutted portions; wherein said carbon powder is added to said adhesive in an amount of 0.001 to 0.016 mg/mm$^2$ (unit area of each joint point) and wherein said carbon powder has a particle diameter of not more than 5 μm; and heating said metallic honeycomb body in a non-oxidizing atmosphere to mutually join said abutted portions between said flat foil and said corrugated foil in a liquid phase.

10. The process according to claim 9, wherein said carbon powder is at least one powder selected from powders of artificial graphite, natural graphite, pyrolytic graphite, petroleum coke and carbon black.

11. The process according to claim 9, wherein said non-oxidizing atmosphere is a vacuum or a protective gas atmosphere.

12. The process according to claim 9, wherein said metallic honeycomb body is heated in a non-oxidizing atmosphere at a temperature in the range from 1000° to 1300° C., held at that temperature for 30 to 120 min and then cooled.

13. The process according to claim 9, wherein said adhesive comprises a thermosetting organic binder dissolved in a solvent.

14. The process according to claim 9, wherein said non-oxidizing atmosphere is a protective gas selected from a group consisting of hydrogen and argon.

* * * * *